US007161320B2

(12) United States Patent
Shimizu et al.

(10) Patent No.: US 7,161,320 B2
(45) Date of Patent: Jan. 9, 2007

(54) CONTROL DEVICE

(75) Inventors: Keiichi Shimizu, Kyoto (JP); Yasuhide Tanaka, Owariasahi (JP); Hideyo Kakuno, Tajimi (JP)

(73) Assignee: Omron Corporation, Kyoto (JP)

( * ) Notice: Subject to any disclaimer, the term of this patent is extended or adjusted under 35 U.S.C. 154(b) by 10 days.

(21) Appl. No.: 10/932,919

(22) Filed: Sep. 2, 2004

(65) Prior Publication Data

US 2005/0057203 A1 Mar. 17, 2005

(30) Foreign Application Priority Data

Sep. 2, 2003 (JP) ............................ 2003-309488

(51) Int. Cl.
*H02P 1/04* (2006.01)

(52) U.S. Cl. ...................... 318/461; 318/280; 318/283; 318/469; 318/466; 49/26; 49/28

(58) Field of Classification Search ........ 318/280–283, 318/286, 466, 468, 469, 461; 49/26, 28
See application file for complete search history.

(56) References Cited

U.S. PATENT DOCUMENTS 3,830,018 A * 8/1974 Arai et al. ..................... 49/28
5,495,161 A * 2/1996 Hunter ....................... 318/807
5,530,329 A * 6/1996 Shigematsu et al. ........ 318/469
5,734,245 A * 3/1998 Terashima et al. .......... 318/453
5,857,061 A * 1/1999 Chang et al. ............... 388/829
5,986,421 A * 11/1999 Fukazawa et al. .......... 318/466
6,906,482 B1 * 6/2005 Shimizu et al. ............. 318/286

FOREIGN PATENT DOCUMENTS

| | | | |
|---|---|---|---|
| JP | 5-89771 | | 12/1993 |
| JP | 7-21982 | | 4/1995 |
| JP | 7-139260 | | 5/1995 |
| JP | 9-60420 | | 3/1997 |
| JP | 9060420 | * | 3/1997 |

* cited by examiner

*Primary Examiner*—Rina Duda
(74) *Attorney, Agent, or Firm*—Osha Liang L.L.P.

(57) ABSTRACT

There is provided a control device for driving a movable member such as a power window of a vehicle under control, in which the action of the movable member (including the manual operation) at an action velocity corresponding to the intention of the user is achieved by operating only a operating knob for issuing a command relating to the action of the movable member. The control device includes a detecting unit which can generate an output value varying in accordance with the action of the operating knob, and a control unit for determining the operating velocity of the operating knob based on the output value, deciding the action velocity according to the determined operating velocity, and driving the motor under control so that the movable member moves at the decided action velocity.

19 Claims, 4 Drawing Sheets

CONTROL DEVICE

BACKGROUND OF THE INVENTION

1. Field of the Invention

The present invention relates to a control device for driving a movable member of electrically-driven equipment under control at a velocity just as a user intended.

2. Description of the Related Art

In recent years, movable members, such as a window (including a sliding roof) or a sliding seat of a vehicle, or automatic door for a building, increasingly employ a drive system utilizing an electric actuator such as a motor (that is, a power window system, for example). In such a system, the movable member is activated by the user by operating a final control element of an operation switch (knob-type or sea-saw type, for example).

In the system of this type, the movable member is operated simply at a constant action velocity according to ON-OFF operation of the switch, and cannot be operated at a velocity just as the user intended since there is no means for switching the action velocity of the movable member. Therefore, there were such problems that when the user wants to finely adjust the extent of opening of the window, the window sometimes excessively moves and hence the user is obliged to re-adjust the position many times, which is troublesome, that the user cannot stop the window accurately at a desired position, or that it cannot cope with the case when the user wants quick operation.

In order to solve these problems, the following technologies are proposed in the related art.

JP-UM-A-5-89771 discloses a control device for a power window in which the action velocity of the opening-closing member is increased gradually as the duration of ON-state of the operation switch by starting the window (window glass) to move at a low velocity when the operation switch is turned on, then switching the duty according to the duration of ON-state of the operation switch, and providing PWM control to the motor according to the duty.

JP-A-9-60420 discloses a control device for a power window in which the velocity of opening-closing operation is adjusted by the amount of turn of a rotary switch and the window is adapted to be opened by a small amount by pushing a separately provided push switch once.

JP-UM-A-7-21982 discloses a control device for a power window in which the action velocity of the window can be switched between low-velocity and high-velocity, so that the action of the window is started at a low-velocity first when the operating switch is turned ON, and then after having elapsed a certain period of time, the velocity is switched to the high-velocity.

JP-A-7-139260 discloses a control device for a power window in which the window is operated at a high velocity when a switch for issuing a command for automatic operation (the operation in which the window is closed to the fully closed position or opened to the fully opened position automatically even when the user stops operation), while the window is operated at a low velocity when a switch for issuing a command for manual operation (the operation in which the movement stops immediately when the user stops operation).

However, the control device disclosed in the respective patent publications described above has the problems to be solved as shown below.

The devices disclosed in JP-UM-A-5-89771 and JP-UM-A-7-21982, when the switch is operated, the window starts operation always at a low velocity, and continues the low-velocity operation until a predetermined period is elapsed. Therefore, when the user wants to open or close the window quickly, it does not necessarily achieve the quick opening-closing operation as the user intended, which makes the user become irritated.

The device disclosed in JP-A-9-60420, since the opening and closing velocity is adjusted according to the amount of turn of the rotary switch (rotary final control element), the user's feeling of operation does not always correspond to the actual action velocity of the window, and hence the operability is not satisfactory. When the rotary switch is employed, there are also problems such that the user cannot have a sensory perception about the relation between the direction of rotation of the final control element of the switch and the direction of movement of the window in comparison with a general final control element (final operating element such as knob-type to be operated by pulling up or pushing down, or a sea-saw type), and that the position of installation of the final control element of the switch tends to project. In addition, when operation switches for a plurality of windows are installed at one location (for example, at a driver's seat), if this technology is applied only to one of the operation switches (for example, the operation switch for the driver's seat) and other operation switches are remained in a general structure, a part of the operation switches exhibits a different shape, which may lead to a design problem (strangeness in design). The device disclosed in JP-A-9-60420 has disadvantage in that the cost may increase by providing the push switch separately.

The device disclosed in JP-A-7-139260 has a problem in that the action velocity cannot be switched when an automatic operating function is not provided. For example, as regards the windows for the rear seats in the vehicle, they are not provided with the automatic operating function normally (that is, they are not provided with switches for automatic operation). In this case, the technology disclosed in JP-A-7-139260 cannot be applied. In a case of a high velocity, it is always operated by the automatic operating function to the fully opened position or to the fully closed position, the manual operation for moving the window at a high velocity to a given position cannot be done.

SUMMARY OF THE INVENTION

Accordingly, it is an object of the present invention to provide a control device which can operate a movable member at a velocity according to the velocity as the user intends only by operating a final control element which issues a command regarding the action (manual operation or/and automatic operation) of the movable member with high operability.

A control device of the invention is a control device for driving a movable member of electrically-driven equipment under control according to the operation of a final control element including: a detecting unit capable of generating an output value according to the operation of the final control element; an operating velocity determining unit for determining the operating velocity of the final control element based on the output value from the detecting unit; and a control unit for determining the action velocity according to the operating velocity determined by the operating velocity determining unit and driving an actuator of the movable member under control so that the movable member is operated at this action velocity.

With this control device, when the user performs the operation for moving the final control element at different velocities intentionally or unconsciously, the action velocity of the movable member can easily be switched, and hence the movable member can be operated with high operability at a desired velocity corresponding to the intension or sensitivity of the user (manual operation or/and automatic operation).

In addition, since the device of the invention can achieved the action of the movable member at an action velocity corresponding to the intension of the user only by the final control element which issues a command regarding the action of the movable member, and the general final control element may be employed, the problem of design caused by provision of the special switch (for example, the rotary switch) as in the related art described above can be avoided.

The "final control element" is a portion where the user moves with his/her finger or the like for issuing a command regarding the action of the movable member, and may be of a knob-type operated by being pulled up or pushed down, or of a sea-saw type. The "final control element" may be for manual operation or for automatic operation, or may be common for both types of operation. If it is for manual operation, the manual operation of the movable member at an action velocity corresponding to the intension of the user, and hence the movable member can be moved to a given position as the user intends at a predetermined velocity.

The "final control element" may be adapted to provide a tactile feedback at a predetermined operating position where a command regarding the action of the movable member is issued, or may not provide the tactile feedback. The "tactile feedback" designates so called "click feeling", which is a feedback provided to the user who operates the final control element by the operating force required for operating the final control element, which increases at a specific operating position (peak position) to form a peak of the operating force, and subsequently decreases to a predetermined end position. This feedback makes the user feel that the operation was executed, and hence the operation of the final control element is stabled, whereby reliable operation is achieved.

The "movable member" includes a window (including a sliding roof) or a seat of a conveyance or a building, or a door of a vehicle or a building or the like. The "conveyance" includes an elevator as well as a vehicle and an airplane.

The "electrically-driven equipment" includes a power window, a power seat, or a power sliding door of the conveyance, or an electrically-driven automatic door of the building or the like.

A detailed configuration of the detecting unit may be as follows.

It may be a unit including a contact-type variable resistance which varies in value of resistance according to the operation of the final control element, converting the value of resistance of the variable resistance to a voltage, and outputting the voltage as the output value, or a unit including a pulse generator for generating pulse signals at a frequency according to the operating velocity of the final control element, and using the pulse signals for determination by the operating velocity determining unit as the output value.

Alternatively, it may be a unit including a switch contact point which is switched between the opened state and the closed state when the final control element is operated over a specific operating position, including a plurality of the specific operating positions and the switch contact points corresponding thereto, and using the terminal voltage of the switch contact points which varies with the switching condition of the switch contact points for determination by the operating velocity determining unit as the output value.

As the detailed structure of the pulse generator, it may be a structure including a comb-shaped fixed contact point and a movable contact point, and repeating ON and OFF operation between the fixed contact point and the movable contact point in association with the operation of the final control element, or may be a structure including a light-emitting device and a light-receiving device, and a shield disposed between these devices (for example, a shield having a plurality of slits for allowing a light beam to pass through formed at regular intervals), and repeating the shielded state and the non-shielded state by the rotation of the shield in association with the operation of the final control element.

When the detecting unit has a configuration including the variable resistance as described above, preferably, the value of resistance of the variable resistance becomes the maximum value when the final control element is at a non-operating position.

In this arrangement, the value of a current to be flown to the variable resistance for converting variations in value of resistance into variations in voltage becomes the minimum value in the non-operating state, so that the current consumption in the non-operating state (idling current) may be reduced. The term "the value of resistance is the maximum" means a state of being significantly higher than the value of resistance in a state in which the final control element is operated to the operating position near the non-operating position, and includes a state in which the value of resistance is infinity (that is, a state in which the idling current is zero).

According to the preferred configuration of the device in the invention, at least the variable resistance, the pulse generator, or the switch contact point are provided as a module so as to be capable of being mounted to a substrate. In this arrangement, standardization of the design and cost reduction by mass production are facilitated, and simultaneously, control or assembly of components are also facilitated.

According to the preferred configuration of the device of the invention, the operating velocity determining unit determines the action velocity of the final control element in an operating process until the final control element reaches the specific operating position as the operating velocity, and when the final control element is operated over a specific operating position, the control unit determines the action velocity of the movable member according to the operating velocity determined by the operating velocity determining unit as the action velocity of the final control element in the operating process until the final control element reaches the specific operating position, and then the actuator is driven under control so that the movable member is operated at the determined action velocity and in a specific operating mode corresponding to the specific operating position.

In this configuration, the action velocity of the movable member is determined according to the action velocity of the movable member in the operating process of the final control element before the timing when a command relating to the specific operating mode of the movable member is issued (that is, when the final control element is moved over the specific operating position), and the movable member is driven under control so as to be operated at the determined action velocity. Therefore, at the timing when the command relating to the specific operating mode of the movable member is issued, the action velocity in this operating mode can be determined immediately to start driving the actuator of the movable member. Consequently, the action of the movable member at the action velocity as the user intends is enabled with high responsibility.

The action velocity of the movable member determined by the control unit in the control device of the invention has preferably a characteristic which increases with increase of the operating velocity until it reaches the specified upper limit value. In this configuration, when the user moves the final control element quickly, the movable member moves quickly correspondingly, and hence a high operability matching to the sensitivity of general people is obtained. In addition, since the upper limit value is provided, the movable member is prevented from acting at an excessively high velocity. The above-described characteristic is not necessarily required to be linear (proportional), but may be non-linear.

The final control element of the device of the invention may be adapted to be operated only in one direction, or to provide a tactile feedback only at a first step (to have only one operating stage). However, the one which can be operated in both directions for issuing different commands relating to the operating mode for each direction (for example, opening operation and closing operation of the window), the one which can be operated in both directions and provides a tactile feedback for each direction for issuing different commands relating to the operating mode for each direction, or the one which is provided with two or more stages of tactile feedback and is adapted to enter command relating to the different operating modes (for example, manual operation and automatic operation of the window) in two or more stages (the one having tow or more states of operation) are applicable. The final control element is not limited to a swinging type, but may be a sliding type or a rotary type. However, the system in which the relation between the operating direction of the movable member and the operating direction of the final control element can be recognized easily is preferable.

With the control device of the invention, when the user performs the operation for moving the final control element at different velocities intentionally or unconsciously, the action velocity of the movable member can easily be switched always, and hence the movable member can be operated with high operability at a desired velocity corresponding to the intension or sensitivity of the user (manual operation or/and automatic operation).

In addition, since the device of the invention can achieved the action of the movable member at an action velocity corresponding to the intension of the user only by the final control element which issues a command regarding the action of the movable member, and the general final control element may be employed, the problem of design caused by provision of the special switch (for example, the rotary switch) as in the related art described above can be avoided.

DESCRIPTION OF THE PREFERRED EMBODIMENTS

Figure 1A:
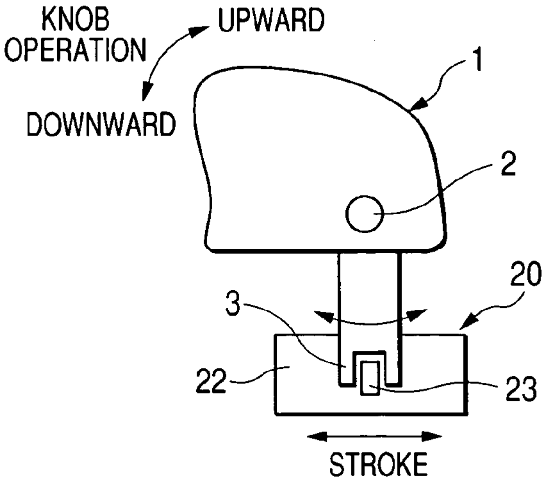
FIG. 1A shows a control device in accordance with one or more embodiments of the invention.

Referring now to the drawings, embodiments of the present invention will be described.

(First Embodiment)

Referring to FIGS. 1A to 1C and FIGS. 2A to 2D, a first embodiment (a power window control device) according to the invention will be described.

Figure 1B:
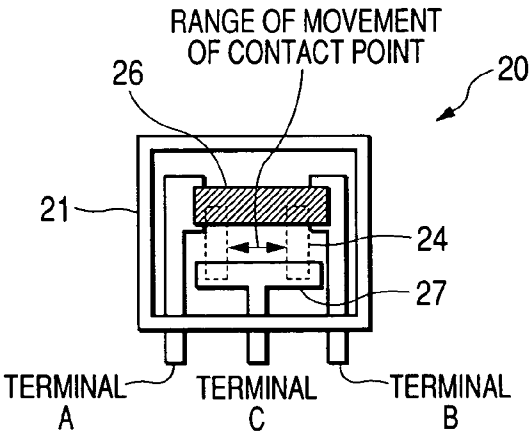
FIG. 1B shows a vertical cross-section of a control device in accordance with one or more embodiments of the invention.
Figure 1C:
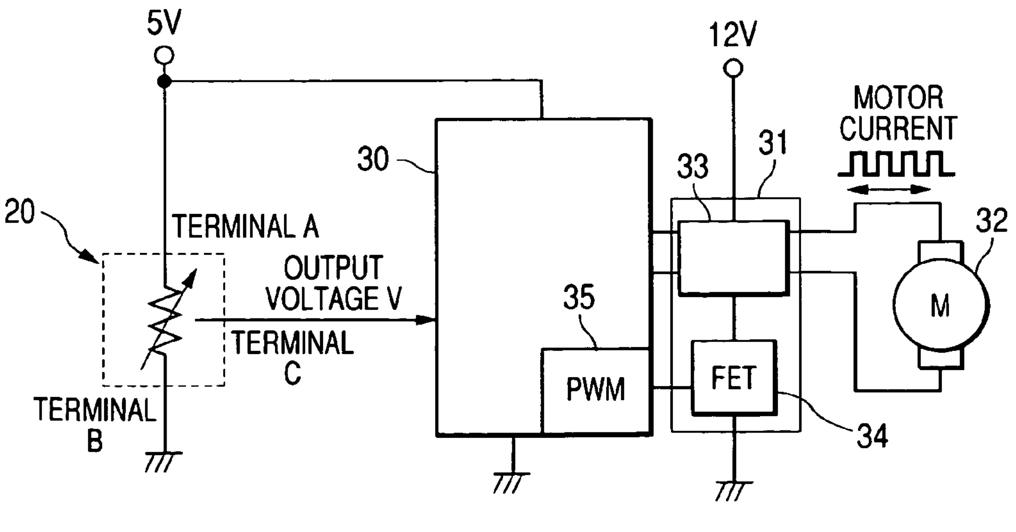
FIG. 1C shows a circuit diagram of a control device in accordance with one or more embodiments of the invention.
Figure 2A:
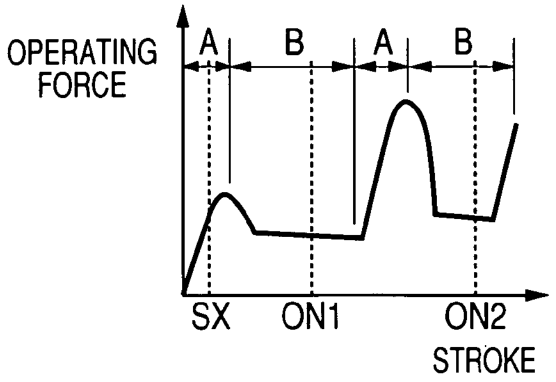
FIG. 2A shows a function of the control device in accordance with one or more embodiments of the invention.
Figure 2B:
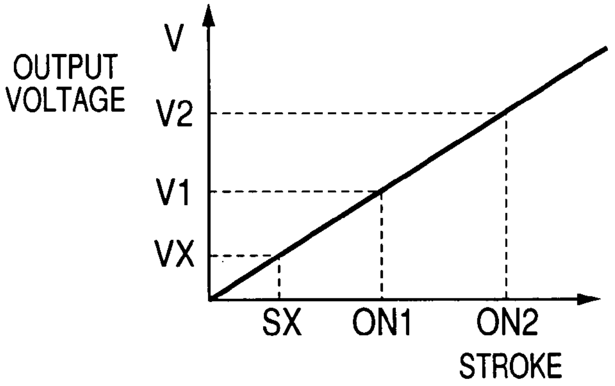
FIG. 2B shows a function of the control device in accordance with one or more embodiments of the invention.
Figure 2C:
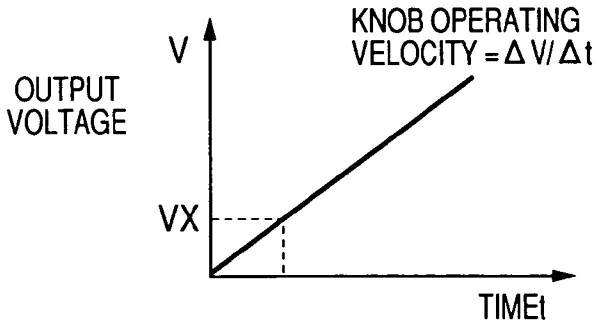
FIG. 2C shows a function of the control device in accordance with one or more embodiments of the invention.
Figure 2D:
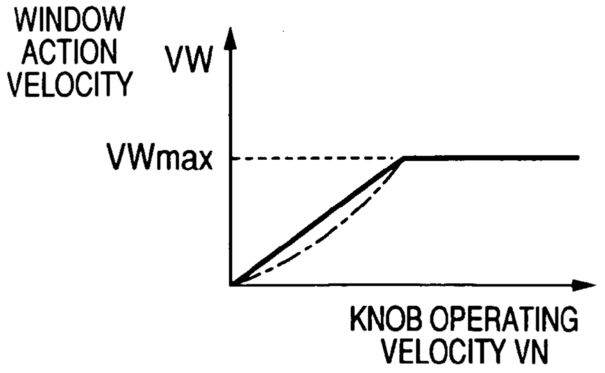
FIG. 2D shows a function of the control device in accordance with one or more embodiments of the invention.

FIG. 1A is a side view showing an operating knob 1, which corresponds to a final control element, and a switch body 20 (variable resistance), which corresponds to a detecting unit in the present embodiment; FIG. 1B is a vertical cross-section of the switch body 20; and FIG. 1C is a circuit diagram of the control device according to this embodiment. FIG. 2A is a drawing showing a relation between the stroke and the operating force of the operating knob 1, and FIG. 2B is a drawing showing a relation between the stroke of the operating knob 1 and the output voltage V of the switch member 20. FIG. 2C is a drawing showing an example of variations of the output voltage V of the switch member 20 with time, and FIG. 2D is a drawing showing the relation (characteristic of variations of action velocity) between the action velocity of the operating knob 1 (knob operating velocity VN) and the action velocity of the window (movable member)(window velocity VW).

As shown in FIG. 1A, the operating knob 1 swings in the pulling-up direction (upward direction) and the pushing-down direction (downward direction) about a shaft 2 and engages a slider 23, described later, of the switch member 20 at an engaging portion 3 on the side of the lower end. Therefore, when the operating knob 1 is operated in the pulling-up direction, the slider 23 (movable contact point 24), described later, moves leftward in parallel in FIGS. 1A, 1B, and when the operating knob 1 is operated in the pushing-down direction, the slider 23 (movable contact point 24) moves rightward in parallel in FIGS. 1A, 1B.

In this case, although two stages of tactile feedback as shown in FIG. 2A is applied to the operating knob 1 in both directions, since the configuration of a tactile feedback generating unit for generating the tactile feedback may be the same as that in the related art (for example, the configuration stated in JP-A-2001-118465), illustration and description will be omitted.

As shown in FIGS. 1A, 1B, the switch body 20 is formed as a module so as to be capable of being mounted on a substrate, and includes a rear case 21 and a front case 22 formed of synthetic resin, the slider 23 formed of synthetic resin to be movable stored in these cases, a movable contact point 24 to be mounted in the slider 23 on the inner side, and a spring (not shown) provided between the movable contact point 24 and the slider 23 for urging the movable contact point 24 toward inside (the side of a printed resistance 26, described later). On the inner surface of the rear case 21 on the inner side, there are formed the printed resistance 26, a fixed contact point 27, and terminals A, B, C by insert mold or the like as shown in FIG. 1B. The slider 23 projects outwardly of the front case 22 (forward on the near side), and has an engaging projection for engaging the engaging portion 3 of the operating knob 1 described above. However, in FIG. 1A, the engaging projection of the slider 23 is shown, but the body portion of the slider 23 is omitted.

The slider 23 or the movable contact point 24 are adapted to move laterally (in the longitudinal direction of the printed resistance 26) in FIG. 1B when the operating knob 1 is operated as described above. In this case, the movable contact point 24 is positioned at the center of the printed resistance 26 when the operating knob 1 is at a neutral position (the neutral position where no external force is exerted). When the operating knob is operated in the pulling-up direction, the movable contact point 24 moves leftward from the center position, while when it is operated in the pushing-down direction, the movable contact point 24 moves rightward from the center position.

The connecting ends of the terminals A, B, C are projecting from the lower surface of the rear case 21 downward as shown in FIG. 1B (so as to be capable of being inserted into through holes on the substrate), so that the switch body 20 can easily be mounted to the substrate.

As shown in FIG. 1B, the printed resistance 26 has a band shape having a constant width, and the fixed contact point 27 is disposed in parallel with the printed resistance 26 and also has a band shape having a constant width. The movable contact point 24 is urged by the spring and is in contact both with the printed resistance 26 and the fixed contact point 27, and when it slides laterally in association with the operation of the operating knob 1, it moves in a state of being in contact with the printed resistance 26 and the fixed contact point 27.

The terminal A is connected to one end of the printed resistance 26, and the terminal B is connected to the other end of the printed resistance 26. The terminal C is a terminal formed integrally with the fixed contact point 27.

The switch body 20 is adapted in such a manner that the value of resistance between the terminals AC or BC varies when the movable contact point 24 comes into contact locally with the printed resistance 26 and the contact portion is displaced in association with the movement of the movable contact point 24, whereby the variable resistance which is part of the detecting unit of the invention is realized.

The circuit structure of the control device according to the preset embodiment is configured as shown in FIG. 1C.

In other words, the terminal A of the switch body 20 is connected to a power source line (5V, for example), the terminal B is connected to the ground, the terminal C is connected to a signal input terminal of a controller 30, and the controller 30 provides PWM control to a motor 32 (the actuator of the power window) via a motor drive circuit 31.

When the switch body 20 is connected to the power source line and the signal line as described above, variations in value of resistance described above is converted into the variation in voltage (for example, variation within the range from 0V to 5V) and outputted from the terminal C, and the output voltage V outputted from the terminal C (output value of the detecting unit) exhibits a preferable characteristic which varies linearly with respect to the stroke of the operating knob as shown in FIG. 2B.

When the operating knob is of a swinging type, since the swinging angle of the operating knob and the amount of displacement of the movable contact point 24 are not in the linear relation in narrow sense. Therefore, when such non-linear property is taken into account, the graph shown in FIG. 2B does not exhibit an accurately linear characteristic. However, such non-linear component is negligible since it is normally just a small amount. It is easy to obtain more linear characteristic by varying the width of the printed resistance 26 in the longitudinal direction (sliding direction of the movable contact point 24) and canceling the non-linear component described above in the relation between the stroke (swinging angle) of the operating knob and the amount of displacement of the movable contact point 24.

The motor drive circuit 31 includes a relay circuit 33 having two relays for switching the respective coil terminals of the motor 32 to connect with the ground line or the power source line (12 V, for example), and a FET (Field Effect Transistor) 34 connected to the ground side on the energized line on the relay circuit 33 (that is, the energized line of the motor 32) for opening and closing the energized line.

The controller 30 includes a control circuit having a processing unit such as a microcomputer, a memory (storage unit) such as EEPROM for storing reference values for determining the operation so as to be rewritable, a converter for converting the voltage of the terminal C to a digital value, and a PWM drive circuit 35 for providing PWM drive to the FET 34, and is an element constituting an operating velocity determining unit of the invention. The motor drive circuit 31 and the controller 30 constitute the control unit of the invention.

Reference values V1, V2 for each operating direction are registered in advance in the controller 30. In the case of the circuit structure shown in FIG. 1C, the reference values V1, V2 in the direction of pulling-up the operating knob (upward direction) are set to the values in the order of, for example, 3V and 4V, while the reference values V1, V2 in the direction of pushing-down the operating knob (downward direction) are set to the values in the order of, for example, 2V and 1V. The controller 30 determines the operating details by comparing the output value of the switch body 20 (the voltage at the terminal C) with the reference values, drives one of the relays on the relay circuit 33 based on the result of the determination of the operation, and performs control of drive mode such as manual upward operation, automatic upward operation, manual downward operation or automatic downward operation of the window.

For example, when the output value of the switch body 20 exceeds the reference value V1 in the upward direction, it is determined that a command of the manual upward operation is issued, while it exceeds the reference value V2 in the upward direction, it is determined that a command of the automatic upward operation is issued. In contrast, when the output value of the switch body 20 underruns the reference value V1 in the downward direction, it is determined that a command of the manual downward operation is issued, and when it underruns the reference value V2 in the downward direction, it is determined that a command of the automatic downward operation is issued.

The reference values V1, V2 in the respective operating directions can be set to optimal values easily by absorbing variations in dimensional accuracy or positional accuracy of components according to the following procedure. In other words, in a state in which the operating knob or the switch body 20 are actually assembled, the output value described above (voltage at the terminal C) or the operating force are measured while actually operating the operating knob 1, and the output value immediately after having generated the tactile feedback in the first stage (the position ON1) is determined to be the reference value V1, and the output value immediately after having generated the tactile feedback in the second stage (the position ON2) is determined to be the reference value V2 respectively for the upward direction and the downward direction.

The controller 30 has a function to determine the action velocity (operating velocity VN) of the operating knob in the operating process of the operating knob 1 until the specific operating position (in this case, the position of ON1) at which the command relating to the operation is issued based on the output voltage V of the switch body 20, and decide the subsequent action velocity VW of the window. More specifically, in this case, when the operating knob 1 is operated to the SX point (output voltage V=VX) on the stroke shown in FIGS. 2A, 2B, a differential value ($\Delta V/\Delta t$) or a derivative value (dV/dt) per unit time of the output voltage V which changes with time as shown in FIG. 2C is obtained at this SX point (or in a certain range around the SX point), and a procedure for renewing and registering this value as the operating velocity VN is performed every time.

The SX point on the stroke for measuring the operating velocity VN is preferably set within a range in which the operating user can easily control the operating velocity VN. In this example, it is preferable to set within a range A (the range until the timing immediately before the tactile feedback is provided) shown in FIG. 2A.

When the operating velocity VN of the operating knob 1 is updated and registered in this manner, the controller 30 decides the action velocity VW of the window, which corresponds to the movable member, from the operating velocity VN based on a predetermined relational expression or a data table. In this case, the relation between the operating velocity VN and the action velocity VW, for example, as shown in FIG. 2D (a characteristic in which the action velocity VW increases with respect to increase in the operating velocity VN until it reaches the specified upper limit value VWmax) is registered in the controller 30 as a relational expression or a data table.

Subsequently, the controller 30 performs the manual operation as described above when the operating knob 1 is continuously operated in the same direction and exceeds the ON 1 point (output voltage V=V1) on the stroke, and then performs the automatic operation when it exceeds the ON 2 point (output voltage V=V2) as described above. In this case, the duty of the PWM driving is adjusted and the FET 34 is driven so that the action velocity VW of the window becomes a value decided according to the operating velocity VN as described above.

Accordingly, at least when the window (motor 32) is in the steady state (the state other than the transient state such as the time of starting or stopping), the manual operation or the automatic operation is performed at a speed as shown as the relation between the operating velocity VN and the action velocity VW as shown in FIG. 2D.

According to the control device of the present embodiment described above, the output value (the voltage at the terminal C) according to the operating state (operating direction and the amount of operation) of the operating knob 1 is supplied to the controller 30 for determining the operation from the manual upward operation, the automatic upward operation, the manual downward operation, or the automatic downward operation, so that the drive control of the window as in the related art is achieved.

Also, according to the control device, when the user performs the operation for moving the operating knob 1 at different velocities intentionally or unconsciously, the action velocity of the window, which is the movable member, can easily be switched, and hence the movable member can be operated with high operability at a desired velocity corresponding to the intension or sensitivity of the user (manual operation or/and automatic operation).

In addition, since the device of the invention can achieved the action of the movable member at the action velocity corresponding to the intension of the user only by the operating knob 1 which issues a command regarding the action of the window, and the problem of design caused by provision of the special switch (for example, the rotary switch) as in the related art described above can be avoided.

Since the output value of the detecting unit in the present embodiment (switch body 20) varies continuously, the stroke position of the operating knob 1 at which the operating velocity VN is calculated and determined (for example, the position of the aforementioned SX point) can be set arbitrarily. Therefore, by limiting the position or range of measurement to the range A as described above, the velocity of the operating knob 1 can be advantageously detected more accurately.

(Second Embodiment)

Subsequently, a second embodiment (control device for a power window) of the present invention will be described based on FIGS. 3A, 3B.

Figure 3A:
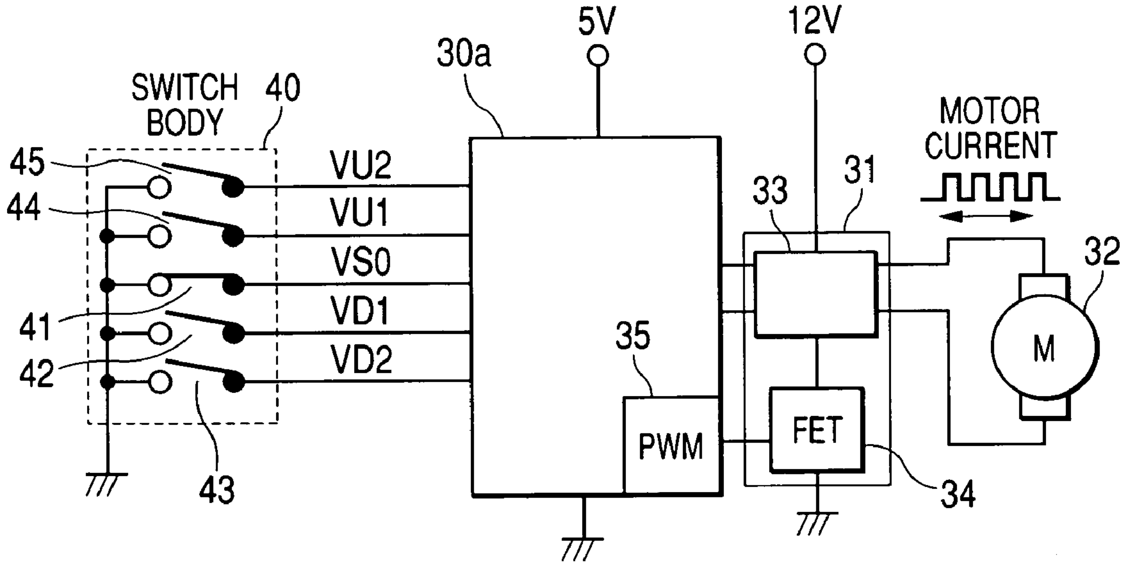
FIG. 3A shows another example of the control device.
Figure 3B:
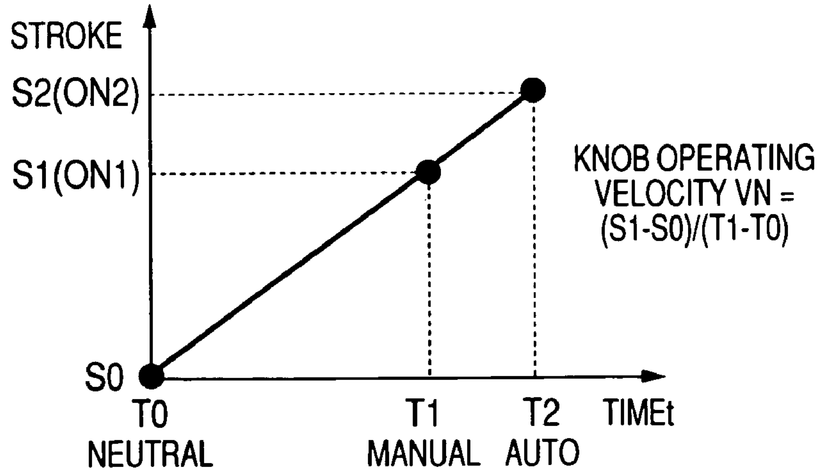
FIG. 3B shows another example of the control device.

FIG. 3A is a circuit diagram of the control device according to the present embodiment. FIG. 3B is a drawing showing an example of variations of the stroke position of a switch body 40 with time. The components which are the same as the first embodiment are designated by the same reference numeral and the overlapped description will be omitted.

The control device according to the present embodiment includes the switch body 40 having a plurality of switch contact points 41–45 as shown in FIG. 3A, and a controller 30*a* for determining the operation based on the output voltage values VS0, VD1, VD2, VU1, VU2 of the respective switch contact points 41–45 of the switch body 40 and performing the drive control of the motor 32.

The switch contact point 41 of the switch body 40 is a contact point b which becomes ON-state (closed state) when the operating knob 1 is at the neutral position, and becomes OFF-state (opened state) when the operating knob 1 is moved to the position other than the neutral position.

The switch contact point 42 is a contact point a which is changed from the OFF-state to the ON-state when the operating knob 1 is operated in the downward direction and moved over the position of ON1 in the downward direction.

The switch contact point 43 is a contact point a which is changed from the OFF-state to the ON-state when the operating knob 1 is operated in the downward direction and moved over the position of ON2 in the downward direction.

The switch contact point 44 is a contact point a which is changed from the OFF-state to the ON-state when the operating knob 1 is operated in the upward direction and is moved over the position of ON1 in the upward direction.

The switch contact point 45 is a contact point a which is changed from the OFF-state to the ON-state when the operating knob 1 is operated in the upward direction and is moved over the position of ON2 in the upward direction.

When the terminals on the low-potential sides of the respective switch contact points 41–45 are connected to the ground and the terminals on the high-potential sides (output terminal) are connected to the power source (5V) via a pull-up resistance, not shown.

Therefore, when the switch contact point 41 is in the ON-state, the output voltage VS0 (voltage of the terminal on the high-potential side) become a L-level (ground potential), and when the switch contact point 41 is in the OFF-state, the output voltage VS0 becomes a H-level (power source potential).

In the same manner, when the respective switch contact points 42–45 are in the OFF-state, the output voltages VD1, VD2, VU1, VU2 of the respective switch contact points 42–45 become the H-level respectively, and when the respective switch contact points 42–45 are in the ON-state, the respective output voltage VD1, VD2, VU1, VU2 become the L-level respectively.

Subsequently, the controller 30*a* determines the state of the respective switch contact points 41–45, that is, the operating state of the operating knob 1 by the output voltages VS0, VD1, VD2, VU1, VU2, and one of the relays of the relay circuit 33 is driven based on the determination of the operating state to perform drive control of the manual upward operation, the automatic upward operation, the manual downward operation or the automatic downward operation of the window.

In other words, when the output voltage VU1 of the switch contact point 44 reaches the L-level, it is determined that a command for the manual upward operation is issued, and when the output voltage VU2 of the switch contact point 45 reaches the L-level, it is determined that a command for the automatic upward operation is issued. When the output voltage VD1 of the switch contact point 42 reaches the L-level, it is determined that a command for the manual down operation is issued and when the output voltage VD2 of the switch contact point 43 reaches the L-level, it is determined that a command for the automatic downward operation is issued.

The controller 30*a* has a function to determine the action velocity (operating velocity VN) of the operating knob 1 in the operating process of the operating knob 1 until the specific operating position (in this case, the position of ON1) at which the command relating to the operation is issued based on the output voltage of the switch body 40, and decide the subsequent action velocity VW of the window. More specifically, in this case, a process of storing the time T0 when the opening knob 1 is moved away from the neutral position (stroke; S0) (when the output voltage VS0 is changed from the L-lever to the H-level) and the time T1 when the operating knob 1 reached to the position of ON1 on the stroke (stroke; S1) (when the output voltage VU1 or VD1 is changed from the H-level to the L-level and the command for the manual operation is issued), as shown in FIG. 3B, obtaining the average action velocity ((S1−S0)/(T1−T0)) of the operating knob 1 between T0 and T1 at a timing immediately after the operating knob 1 reaches the position of ON1 for example, and renewing and registering the obtained value as the operating velocity VN is performed every time.

When the operating velocity VN of the operating knob 1 is updated and registered in this manner, the action velocity VW of the window, which corresponds to the movable member, is decided and then updated and registered based on the preset relational expression or the data table (for example, the relation between the operating velocity VN and the action velocity VW as shown in FIG. 2D), and the controller 30*a* performs the above-described manual operation. Subsequently, when the operating knob 1 reaches the position of ON2 (stroke; S2) on the stroke (when the output voltage VU2 or VD2 reaches from the H-level to the L-level, and a command of the automatic operation is issued), the controller 30*a* performs the automatic operation as described above. In this case, the duty of the PWM drive is adjusted and the FET 34 is driven so that the action velocity VW of the window becomes the value decided according to the operating velocity VN as described above.

Accordingly, at least when the window (motor 32) is in the stationary state, the manual operation or the automatic operation is performed at a speed according to the relation between the operating velocity VN and the action velocity VW as shown in FIG. 2D.

Therefore, according to the device of the second embodiment as well, the same effects as the first embodiment are achieved.

The invention is not limited to the above-described embodiments, and various modifications or applications are possible.

For example, in the same circuit structure, a control device for the sliding roof, the power seat, or the power sliding door of the vehicle, or the electrically-driven automatic door for the building can be realized to obtain the same effects.

Figure 4A:
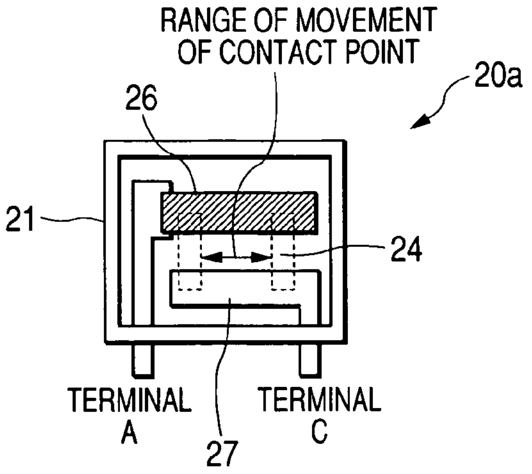
FIG. 4A shows another example of the control device.

When the detecting unit of the invention is composed of by the variable resistance, it is not limited to the three-terminal system as shown in the first embodiment, and may be composed of the switch body 20*a* of two-terminal system as shown in FIG. 4A, for example. Even with such a variable resistance of two-terminal system, the detecting unit of the invention may be configured in such a manner that the terminal voltage at one of the variable resistances is varied with the action of the operating knob by being connected between the ground power sources in series with the voltage dividing resistance or the constant current circuit, and the varied terminal voltage is used as the output value.

Preferably, as described above, when the detecting unit includes the variable resistance, it may be configured in such a manner that the resistant value of the variable resistance becomes the maximum value when the operating knob is at the non-operating position. For example, in the printed resistance 26 of the switch body 20*a* shown in FIG. 4A, the portion which comes into contact with the movable contact point 24 when the operating knob 1 is at a neutral position may be formed of a high-resistance member (or non-conductive member).

The variable resistance which constitutes the detecting unit may be a rotary type.

As described above, the detecting unit of the invention may include a pulse generator.

Figure 4B:
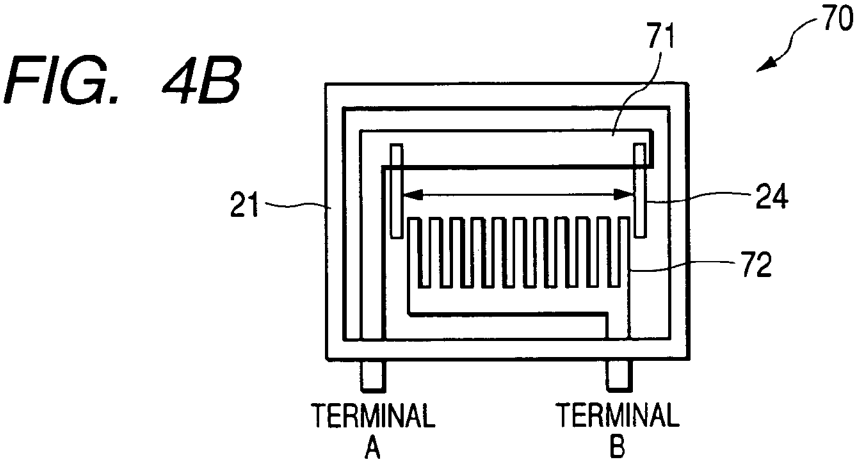
FIG. 4B shows another example of the control device.

Referring now to FIG. 4B, an example of this configuration will be described. FIG. 4B is a vertical cross-sectional view showing a switch body 70 of this embodiment.

The switch body 70 of the present embodiment constitutes a pulse generator generating pulse signals at a frequency according to the action velocity of the operating knob 1, and includes a band-shaped fixed contact point 71 connected to the terminal A, a comb-shaped fixed contact point 72 connected to the terminal B, and the movable contact point 24 sliding laterally along the action of the operating knob, as shown in FIG. 4B.

The fixed contact point 71 is disposed so that the longitudinal direction is oriented in the lateral direction (the direction in which the movable contact point 24 slides), and the fixed contact point 72 is disposed in parallel with the fixed contact point 71, so that the comb-shaped portion of the fixed contact point 72 is disposed along the fixed contact point 71. The movable contact point 24 is always in contact with the laterally elongated fixed contact point 71, but only the comb-shaped portion thereof is in contact with the fixed contact point 72. Therefore, the contact state and the non-contact state are repeated alternately at regular intervals along with the action of the operating knob 1 (the structure to repeat ON and OFF).

Figure 4C:
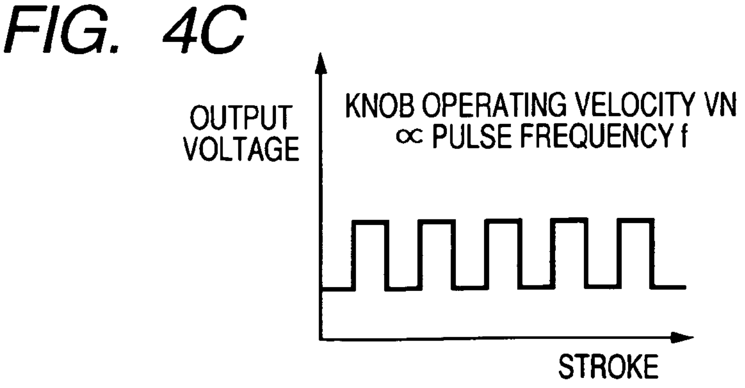
FIG. 4C shows another example of the control device.

Therefore, for example, a power supply voltage is applied to the terminal A and the voltage at the terminal B is outputted from the switch body 70, the output is converted into the pulse signal at frequency (pulse frequency f) according to the action velocity (knob operating velocity VN) of the operating knob 1 as shown in FIG. 4C.

Therefore, when the pulse signal is input to the control circuit 30 and the number of times of output of this pulse signal (the number of pulses) is used for determination of operation of calculation of the knob operating velocity VN, the same action as the first embodiment can be performed, and the same effects are achieved.

In this embodiment, since the absolute position of the operating knob 1 cannot be detected, the controller 30 must recognize the origin (for example the neutral position). However, with the structure in which the operating knob 1 is automatically restored to the neutral position by a restoring force of the spring in non-operating state, such recognition of the origin can be made easily. For example, it can be recognized that the position of the operating knob 1 immediately after having turned the power source of the device ON and then activated the controller 30 is the neutral position.

The method of determination of the knob operating velocity VN and the method of deciding the action velocity VW of the movable member in the invention are not limited to the first embodiment or the second embodiment described above.

For example, it is also possible to obtain the knob operating velocity VN based on variations in output value of the detecting unit in the region B in FIG. 2A, and decide the action velocity VW according to the knob operating velocity VN. The velocity of the manual operation and the speed of the automatic operation can be determined separately. For example, as regards the speed of the automatic operation in the first embodiment, it can be decided based on the knob operating velocity VN obtained as the derivative value of the output voltage V in the region A after the position of ON1 (the region A before the position of ON2).

In the second embodiment, it is also possible to further provide a switch contact point which is turned ON at the position before ON1 (ON1'; Stroke S1'), and obtain the knob operating velocity VN(=(S1−S1')/(T1−T1')) based on the time period (T1−T1') from the timing (T1') when the switch contact point is turned ON until the switch contact point 42 or 44 is turned ON and the difference of stroke (S1−S1') between these positions, so that the action velocity VW of the manual operation or the like is decided according to the obtained knob operating velocity VN.

Alternatively, in the second embodiment, it is also possible to further provide a switch contact point which is turned ON at the position after ON1 and before ON2 (ON2'; stroke is S2'), and obtain the knob operating velocity VN (=(S2'−S1)/(T2'−T1)) based on the time period (T2'−T1) from the timing when the switch contact point 42 or 44 is turned ON (T1) until the switch contact point is turned ON and the difference of stroke (S2'−S1) between these positions, so that the action velocity VW of the manual operation or the like is decided according to the obtained knob operating velocity VN.

When such a switch contact point is further provided, the switch contact point 41 at the neutral position in the second embodiment can be eliminated.

Alternatively, it is also possible to configure in such a manner that the action velocity VW is varied according to the knob operating velocity VN only for the manual operation, and is constant at a predetermined velocity (for example, the maximum velocity VWmax) for the automatic operation.

The relation between the knob operating velocity VN and the action velocity VW may have a non-linear characteristic as shown by an alternate long and short dash line in FIG. 2D for example.

Alternatively, the motor drive circuit 31 in the aforementioned embodiment may be, for example, of H-bridge circuit formed by connecting four transistors in a H-bridge shape.

What is claimed is:

1. A control device for driving a movable member of electrically-driven equipment under control according to the operation of a final control element comprising:

a detecting unit capable of generating an output value according to the operation of the final control element;

an operating velocity determining unit for determining the operating velocity of the final control element based on the output value from the detecting unit; and a control unit for determining the action velocity according to the operating velocity determined by the operating velocity determining unit and driving an actuator of the movable member under control so that the movable member is operated at this action velocity.

2. A control device according to claim 1, wherein the detecting unit comprises a contact-type variable resistance which varies in value of resistance according to the operation of the final control unit, and converts the value of resistance of the variable resistance to a voltage, and outputs the voltage as the output value.

3. A control device according to claim 1, wherein the detecting unit comprises a pulse generator for generating pulse signals at a frequency according to the operating velocity of the final control element, and uses the pulse signals for determination by the operating velocity determining unit as the output value.

4. A control device according to claim 1, wherein the detecting unit comprises a switch contact point which is switched between the opened state and the closed state when the final control element is operated over a specific operating position, comprises a plurality of the specific operating positions and the switch contact points corresponding thereto, and uses the terminal voltage of the switch contact points which varies with the switching condition of the switch contact points for determination by the operating velocity determining unit as the output value.

5. A control device according to claim 1, wherein the operating velocity determining unit determines the action velocity of the final control element in an operating process until the final control element reaches the specific operating position as the operating velocity, and when the final control element is operated over a specific operating position, the control unit determines the action velocity of the movable member according to the operating velocity determined by the operating velocity determining unit as the action velocity of the final control element in the operating process until the final control element reaches the specific operating position, and then the actuator is driven under control so that the movable member is operated at the determined operating velocity and in a specific operating mode corresponding to the specific operating position.

6. A control device according to claim 1, wherein the action velocity of the movable member determined by the control unit in the control device has a characteristic which increases with increase of the operating velocity until it reaches the specified upper limit value.

7. A control device according to claim 1, wherein the electronically-driven equipment is a power window, a power seat, or a power sliding door of the conveyance.

8. A control device according to claim 2, wherein the operating velocity determining unit determines the action velocity of the final control element in an operating process until the final control element reaches the specific operating position as the operating velocity, and when the final control element is operated over a specific operating position, the control unit determines the action velocity of the movable member according to the operating velocity determined by the operating velocity determining unit as the action velocity of the final control element in the operating process until the final control element reaches the specific operating position, and then the actuator is driven under control so that the movable member is operated at the determined operating velocity and in a specific operating mode corresponding to the specific operating position.

9. A control device according to claim 3, wherein the operating velocity determining unit determines the action velocity of the final control element in an operating process until the final control element reaches the specific operating position as the operating velocity, and when the final control element is operated over a specific operating position, the control unit determines the action velocity of the movable member according to the operating velocity determined by the operating velocity determining unit as the action velocity of the final control element in the operating process until the final control element reaches the specific operating position, and then the actuator is driven under control so that the movable member is operated at the determined operating velocity and in a specific operating mode corresponding to the specific operating position.

10. A control device according to claim 4, wherein the operating velocity determining unit determines the action velocity of the final control element in an operating process until the final control element reaches the specific operating position as the operating velocity, and when the final control element is operated over a specific operating position, the control unit determines the action velocity of the movable member according to the operating velocity determined by the operating velocity determining unit as the action velocity of the final control element in the operating process until the final control element reaches the specific operating position, and then the actuator is driven under control so that the movable member is operated at the determined operating velocity and in a specific operating mode corresponding to the specific operating position.

11. A control device according to claim 2, wherein the action velocity of the movable member determined by the control unit in the control device has a characteristic which increases with increase of the operating velocity until it reaches the specified upper limit value.

12. A control device according to claim 3, wherein the action velocity of the movable member determined by the control unit in the control device has a characteristic which increases with increase of the operating velocity until it reaches the specified upper limit value.

13. A control device according to claim 4, wherein the action velocity of the movable member determined by the control unit in the control device has a characteristic which increases with increase of the operating velocity until it reaches the specified upper limit value.

14. A control device according to claim 5, wherein the action velocity of the movable member determined by the control unit in the control device has a characteristic which increases with increase of the operating velocity until it reaches the specified upper limit value.

15. A control device according to claim 2, wherein the electronically-driven equipment is a power window, a power seat, or a power sliding door of the conveyance.

16. A control device according to claim 3, wherein the electronically-driven equipment is a power window, a power seat, or a power sliding door of the conveyance.

17. A control device according to claim 4, wherein the electronically-driven equipment is a power window, a power seat, or a power sliding door of the conveyance.

18. A control device according to claim 5, wherein the electronically-driven equipment is a power window, a power seat, or a power sliding door of the conveyance.

19. A control device according to claim 6, wherein the electronically-driven equipment is a power window, a power seat, or a power sliding door of the conveyance.

* * * * *